(12) United States Patent
Duczak

(10) Patent No.: US 8,566,973 B2
(45) Date of Patent: Oct. 29, 2013

(54) SYSTEM, APPARATUS, AND KIT FOR WASHING PETS

(76) Inventor: Peter G. Duczak, Algonquin, IL (US)

(*) Notice: Subject to any disclaimer, the term of this patent is extended or adjusted under 35 U.S.C. 154(b) by 630 days.

(21) Appl. No.: 12/804,616

(22) Filed: Jul. 26, 2010

(65) Prior Publication Data

US 2011/0120386 A1     May 26, 2011

Related U.S. Application Data

(60) Provisional application No. 61/281,708, filed on Nov. 20, 2009.

(51) Int. Cl.
    *A47K 3/20*              (2006.01)

(52) U.S. Cl.
    USPC ............ 4/567; 4/568; 4/559; 4/615; 119/603; 119/604

(58) Field of Classification Search
    USPC .............. 4/567, 568, 507, 512, 492; 141/331, 141/332, 340–343, 334; 239/588; 119/603, 119/604
See application file for complete search history.

(56) References Cited

U.S. PATENT DOCUMENTS

| | | | | | |
|---|---|---|---|---|---|
| 2,383,235 | A | * | 8/1945 | Brown | 285/8 |
| 5,241,714 | A | * | 9/1993 | Barry | 4/605 |
| 5,967,201 | A | * | 10/1999 | Gasior | 141/98 |
| 6,315,220 | B1 | * | 11/2001 | Grubb | 239/588 |
| 6,698,468 | B1 | * | 3/2004 | Thompson | 141/86 |
| 7,717,891 | B1 | * | 5/2010 | Whaley | 604/319 |

* cited by examiner

*Primary Examiner* — Gregory Huson
*Assistant Examiner* — Lauren Heitzer
(74) *Attorney, Agent, or Firm* — Meroni & Meroni, P.C.; Charles F. Meroni, Jr.; Christopher J. Scott

(57) ABSTRACT

A pet wash kit enables a user to outfit a shower head for washing pets adjacent the shower head. The pet-washing kit and/or apparatus comprises a head-to-funnel interface device, a funnel structure, and a length of conduit. The interface device comprises conduit-engaging and head-engaging portions for respectively receiving adjacent portions of a shower head assembly. The funnel structure has a water inlet, a water outlet, and structure for engaging the interfacing device for removably attaching the funnel structure to the shower head assembly. The length of conduit is attachable to the water outlet and extendable therefrom. The funnel structure receives water from the shower head assembly, and the length of conduit directs water away from the funnel structure for enabling a user to selectively discharge water via an optionally nozzled end of the conduit for washing a pet.

18 Claims, 16 Drawing Sheets

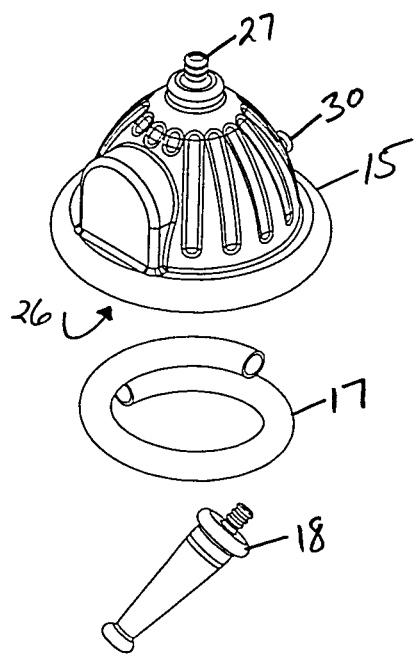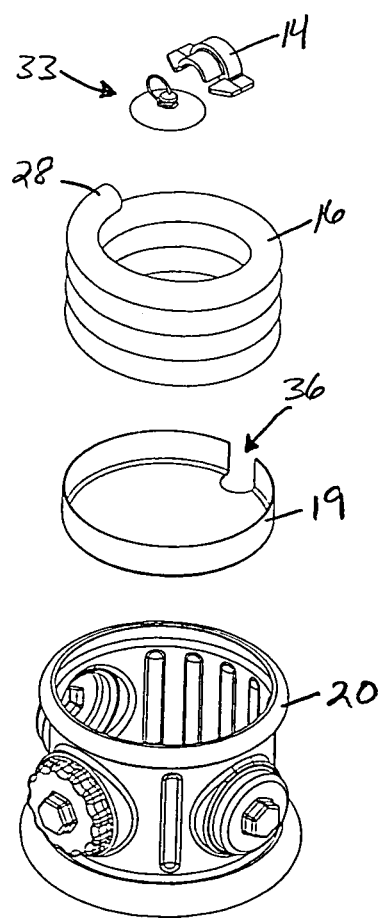
FIG. 1

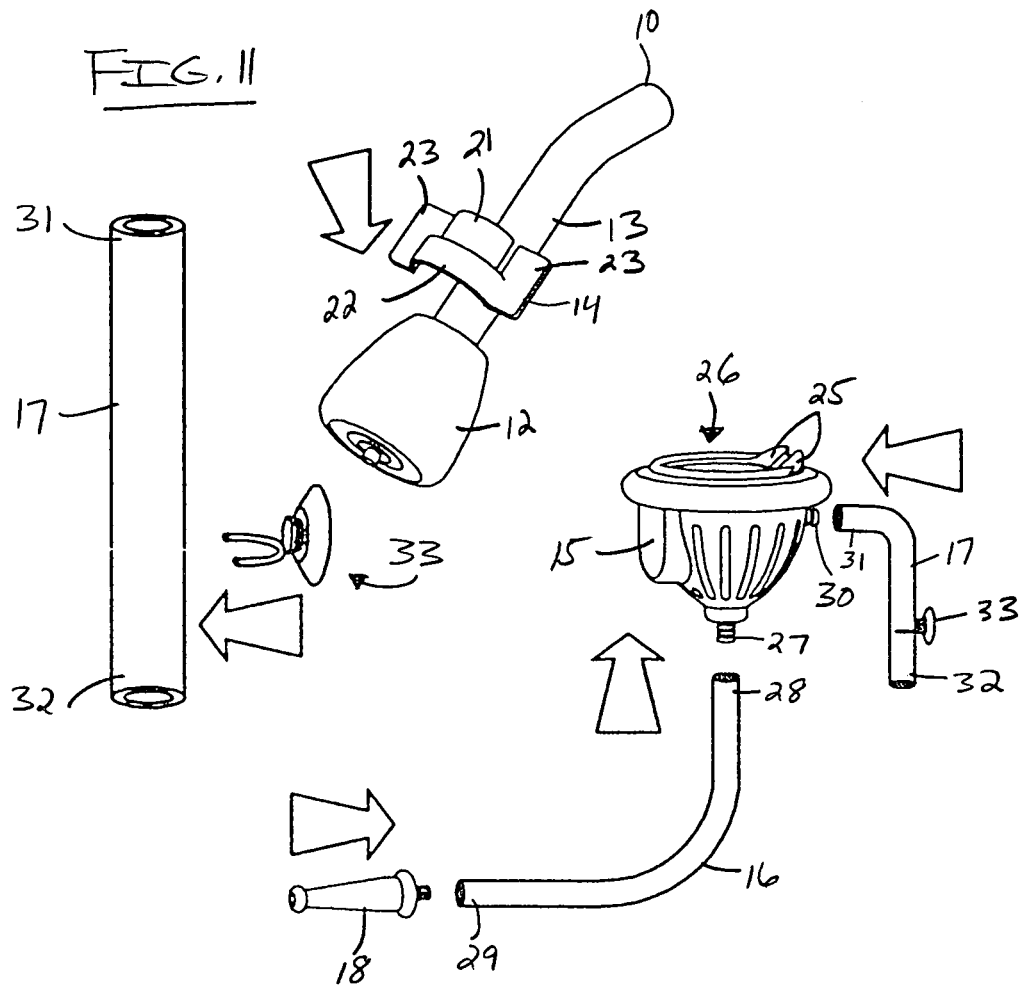

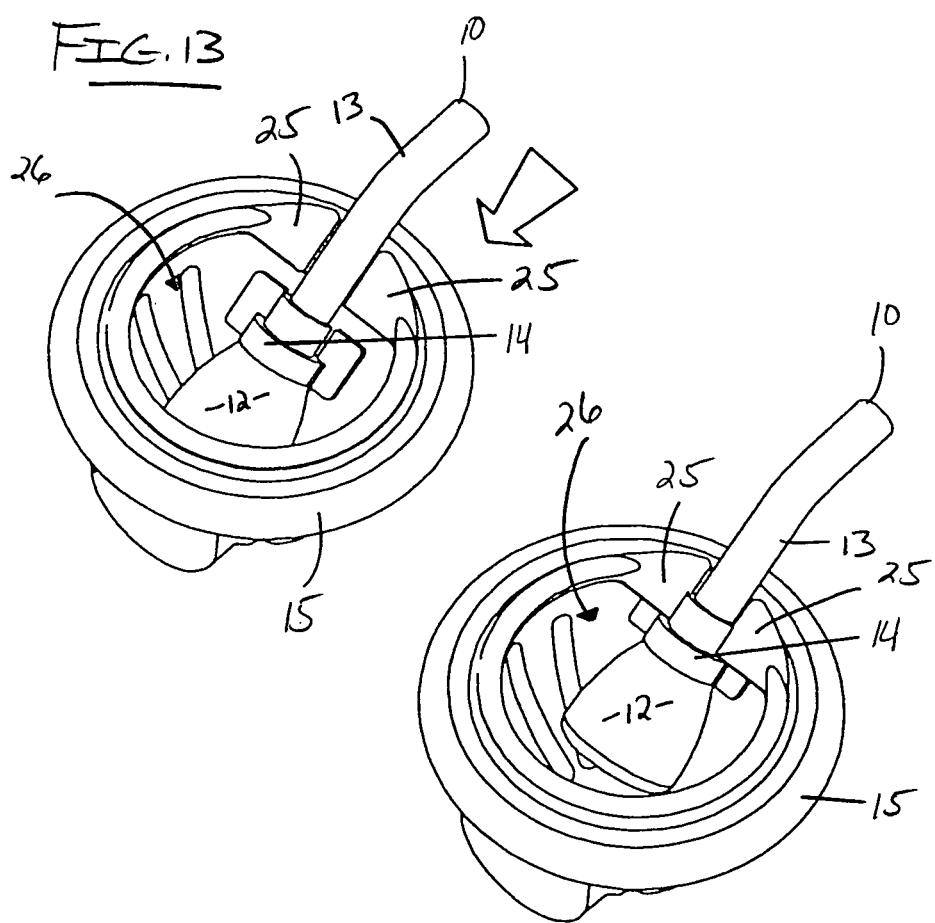

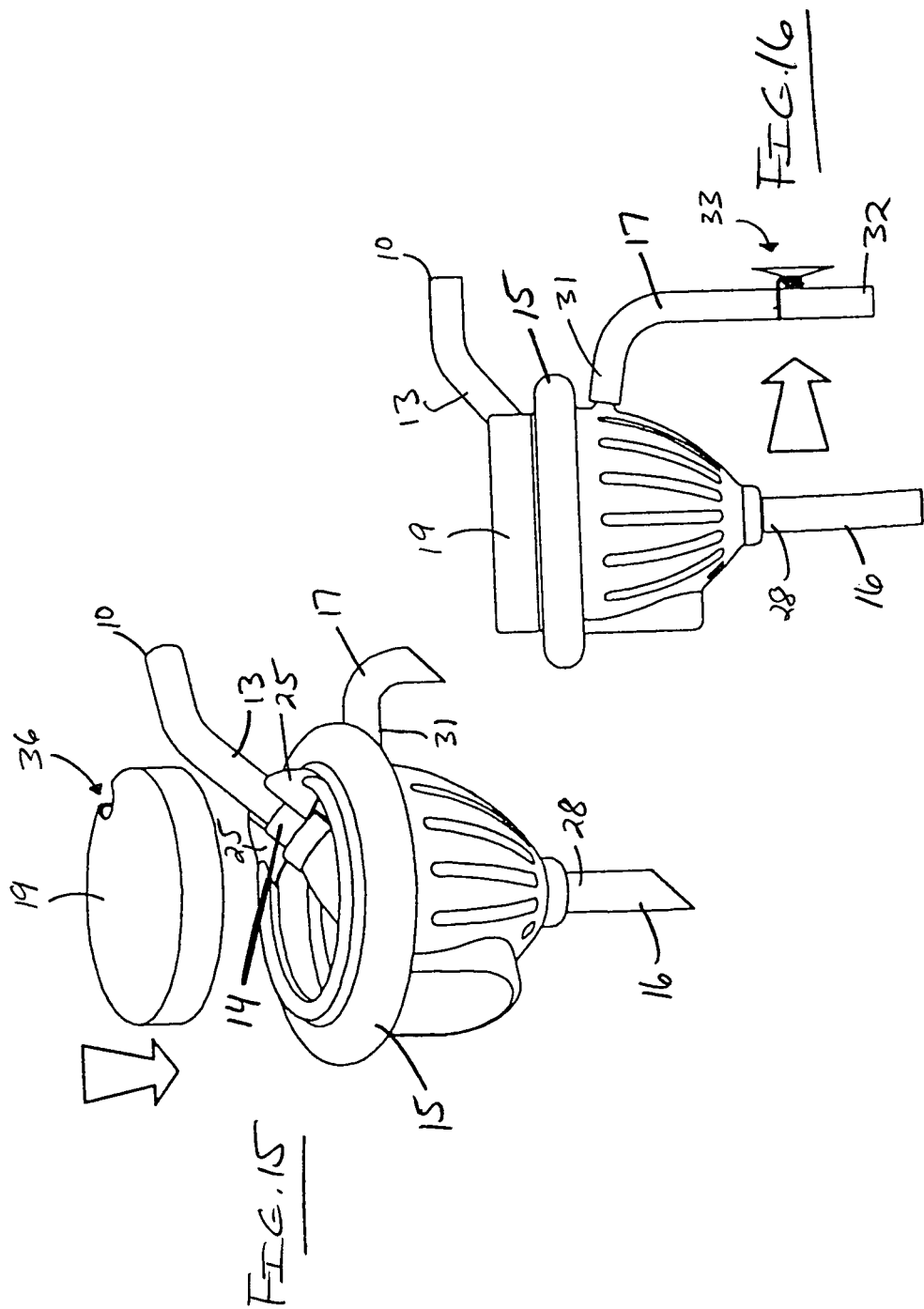

US 8,566,973 B2

SYSTEM, APPARATUS, AND KIT FOR WASHING PETS

PRIOR HISTORY

This application claims the benefit of U.S. Provisional Patent Application No. 61/281,708 filed in the United States Patent and Trademark Office on 20 Nov. 2009.

BACKGROUND OF THE INVENTION

1. Field of the Invention

The present invention generally relates to a kit for washing pets. More particularly, the present invention relates to a method, apparatus, and kit for outfitting a shower head so as to provide the user with a water supply for selectively washing pets received or stationed under the shower head (i.e. within a tub or shower stall).

2. Description of Prior Art

The pet industry is one that is highly developed and continues to spur development in view of the many long felt needs that persist. Indeed, it is noted that pet ownership rates continues to climb, it being estimated at the time of this writing that roughly 68 million people in the United States own dogs alone. In view of this trend, it is further noted that millions of dollars are spent annually to raise healthy, happy pets.

One of the problems commonly associated with pet care is the ability to quickly and efficiently wash one's pet. Oftentimes, one must wonder how to effectively wash a dog or pet at home without messing the laundry room or bathroom. Bath tubs and/or shower stalls, however, provide a place for such activity. The problem with such washing sites, is that there are very few products on the market to enable a user to effectively outfit a shower head with means for re-directing water to the base of the tub or stall for controllably washing a pet.

Of the products on the market, some require the user to change out the shower head, thereby requiring plumbing expertise and tools. Other products require the user to run a line from an outside hose via an attachment, which typically affords the user with access to cold water only. Both of the noted products or attachments are relatively costly.

The prior art thus perceives a need for a funnel-based product easily mounted to a shower head for re-directing water (of a select temperature) from the shower head in a steady, controllable stream with a massaging brush for the pet's comfort. Thus, the pet may be washed regardless of the outside climate, and expensive grooming fees can be avoided. The kit according to the present invention thus provides a low cost means for so outfitting a shower head, which kit may be housed/sold in a package that combines both function and attractive packaging aspects.

SUMMARY OF THE INVENTION

To achieve these and other readily apparent objectives, the present invention essentially provides an apparatus and/or kit for outfitting a shower head assembly for enabling a user to wash a pet adjacent the shower head assembly. The invention may thus be viewed systemically as comprising, in combination a state of the art shower head assembly, a head-to-funnel interface device, a funnel structure, and a first length of conduit.

The shower head assembly essentially comprises a shower head and a length of shower head conduit. The shower head has a first head diameter and the shower head conduit has a second conduit diameter. The head diameter of the shower head is greater in magnitude than the conduit diameter of the shower head conduit.

The head-to-funnel interface device comprises a conduit-engaging portion and a head-engaging portion, each of which are semi-circular in transverse cross-section for receiving the shower head assembly at the junction of the shower head conduit and the shower head. The conduit-engaging portion is sized for receiving the conduit diameter and the head-engaging portion is sized for receiving the head diameter.

The funnel structure may provide a double function as a packaging lid, but as a funnel structure essentially comprises a water inlet and a water outlet. The water inlet has certain structure for engaging the head-to-funnel interface device or device-engaging structure. Said device-engaging structure interfaces with the interfacing device for removably attaching the funnel structure to the shower head assembly.

The first length of conduit is attachable to the water outlet via a first end of the length of conduit, which length of conduit is extendable from the water outlet. The funnel structure receives water from the shower head assembly, and the first length of conduit directs water away from the funnel structure for enabling a user to selectively discharge water for washing a pet.

BRIEF DESCRIPTION OF THE DRAWINGS

Other features of my invention will become more evident from a consideration of the following brief description of patent drawings.

Figure No. 1 is an exploded top perspective view of the apparatus and/or kit according to the present invention showing from top to bottom: a funnel-shaped lid structure, a first length of conduit, a nozzle element, a head-to-funnel interface device, a suction cup assembly, a coiled second length of flexible conduit, a splash lid (bottom perspective), and a base housing.

Figure 2:
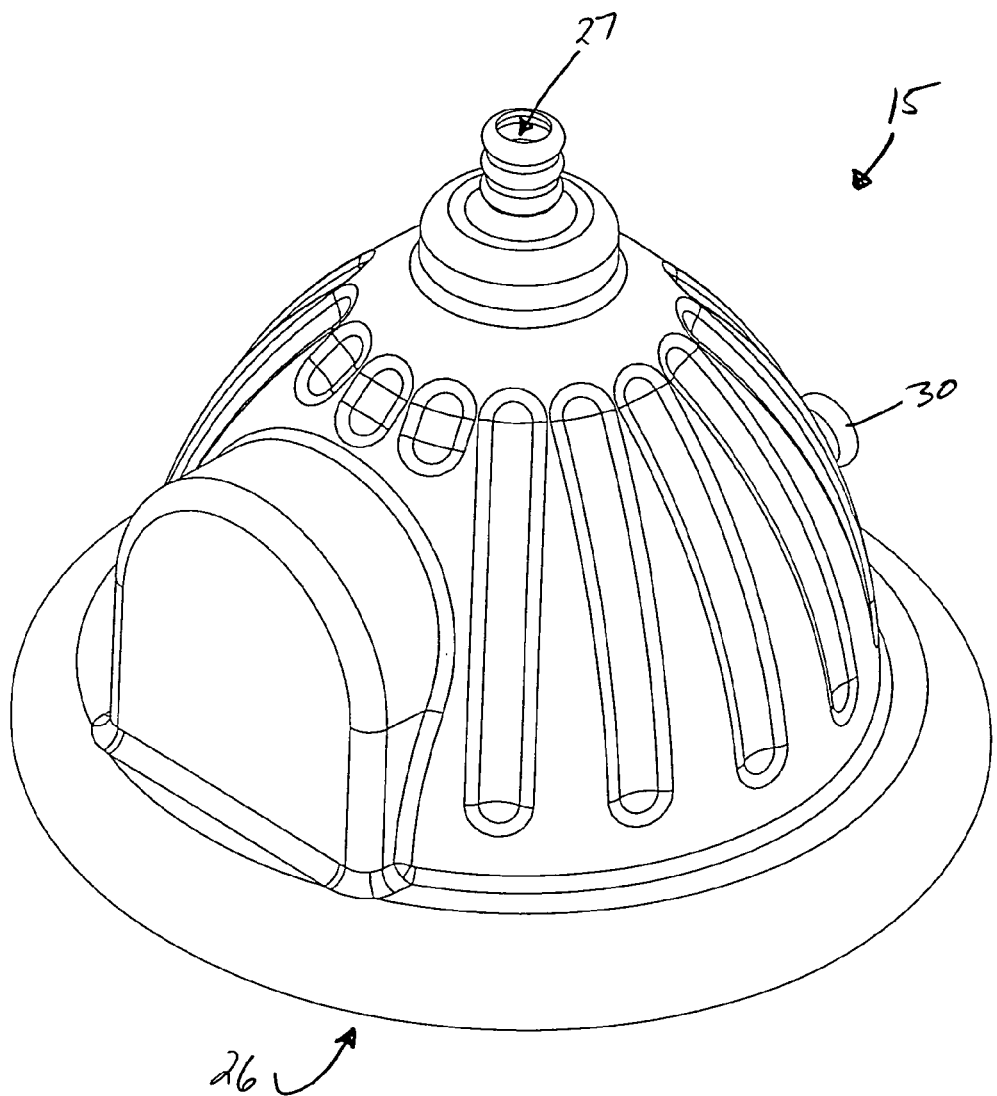
Figure 3:
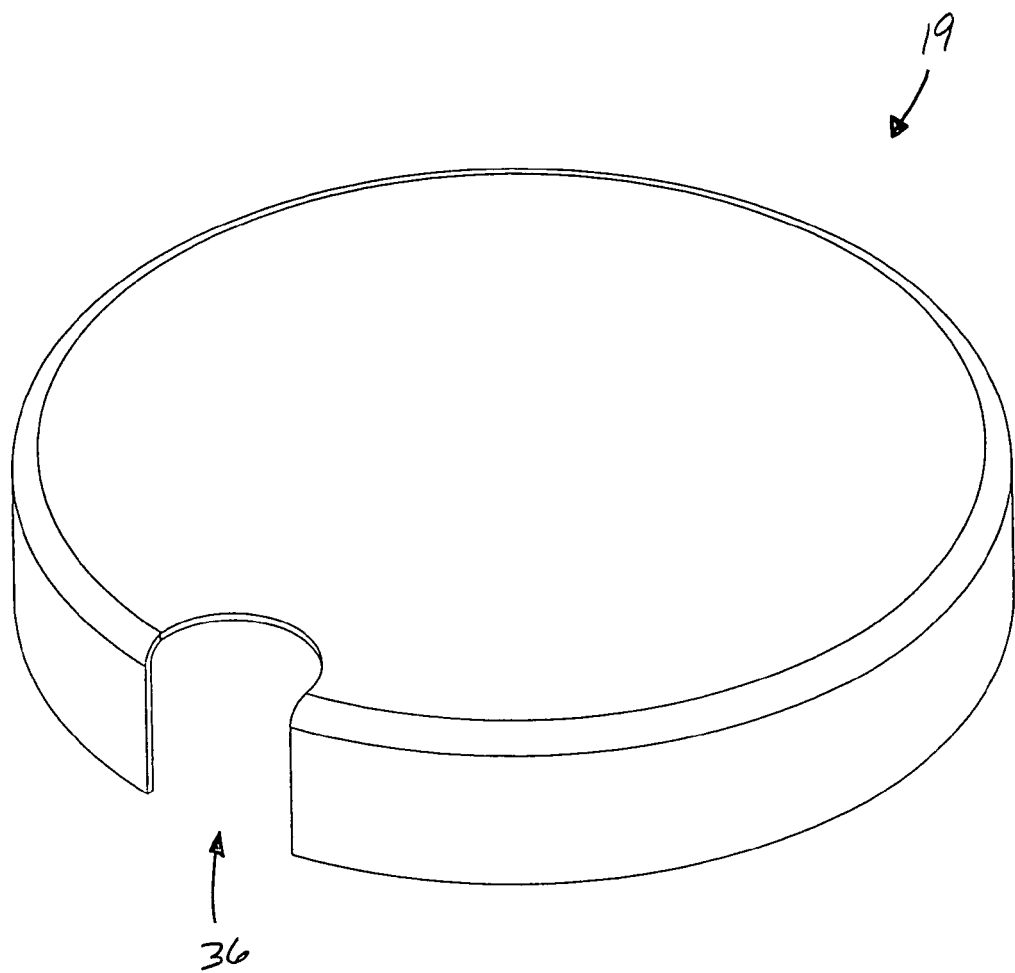
Figure 4:
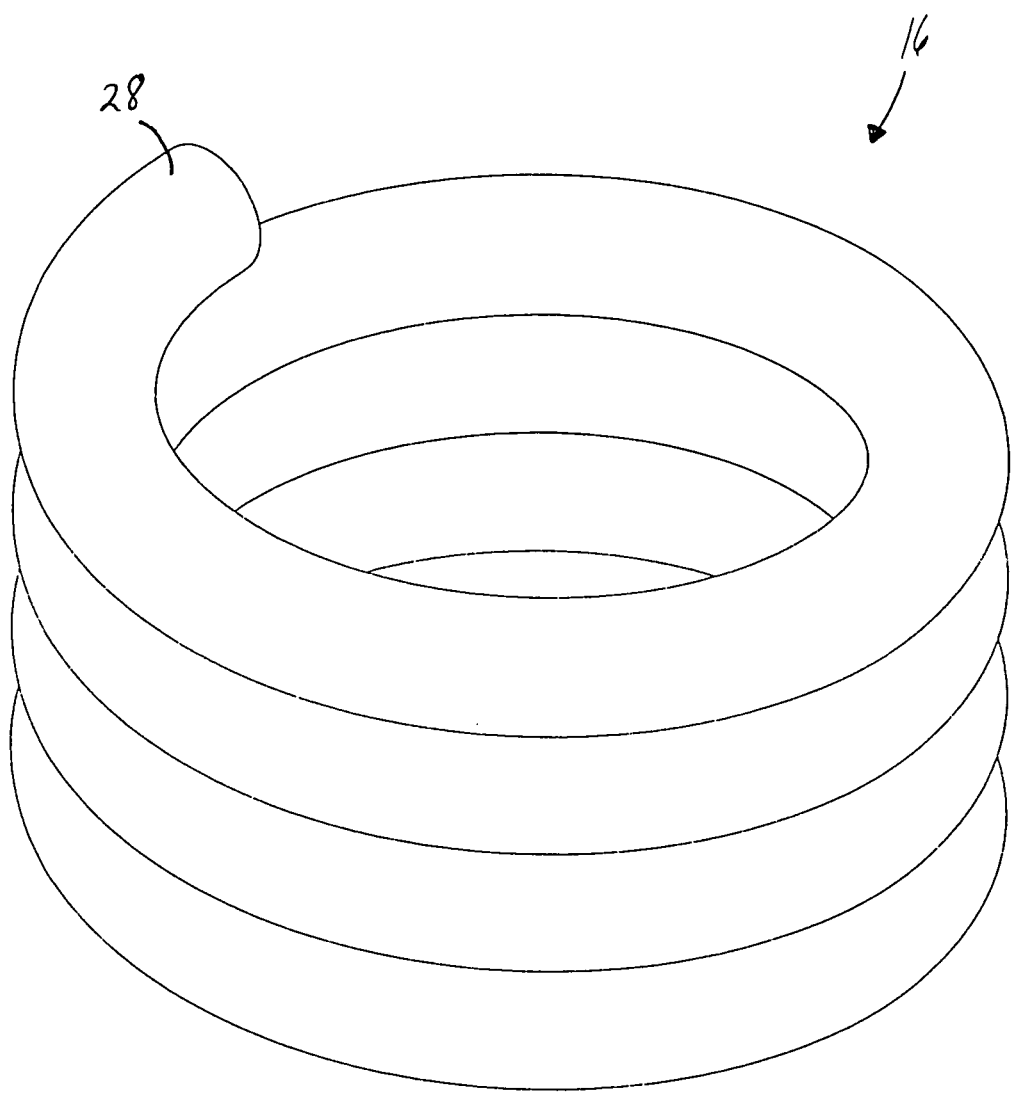
Figure 5:
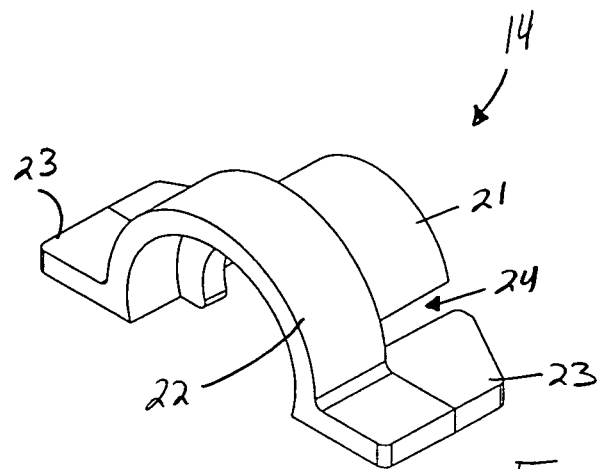
Figure 6:
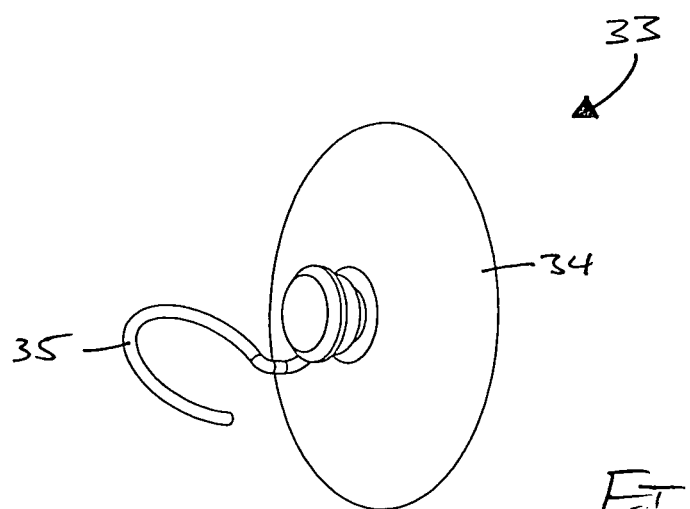
Figure 7:
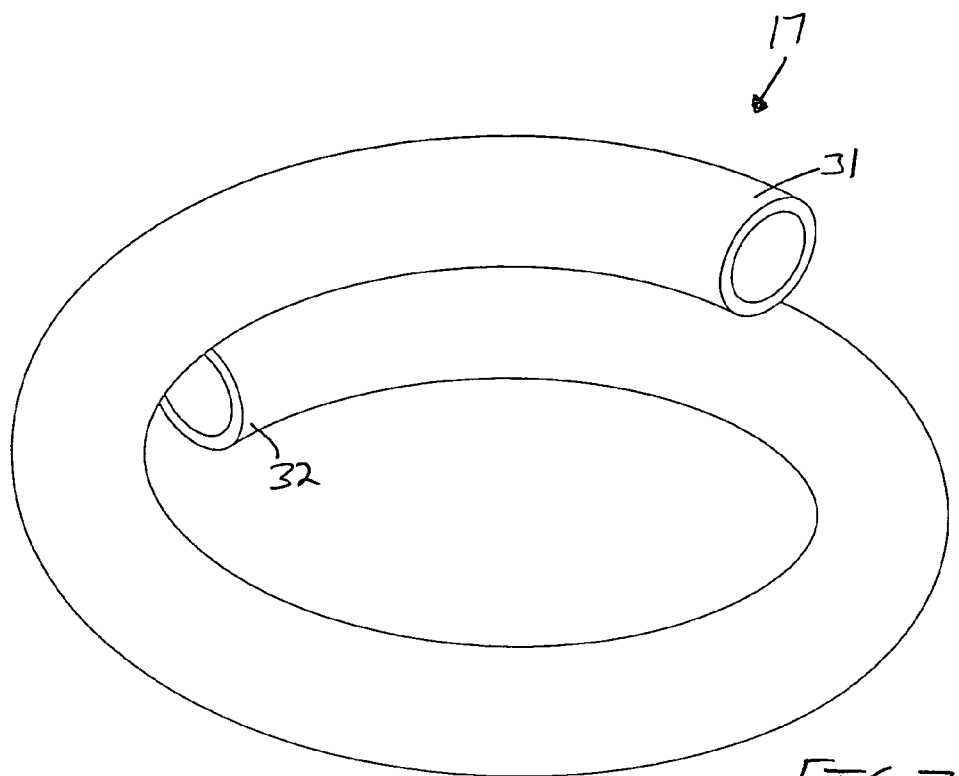
Figure 8:
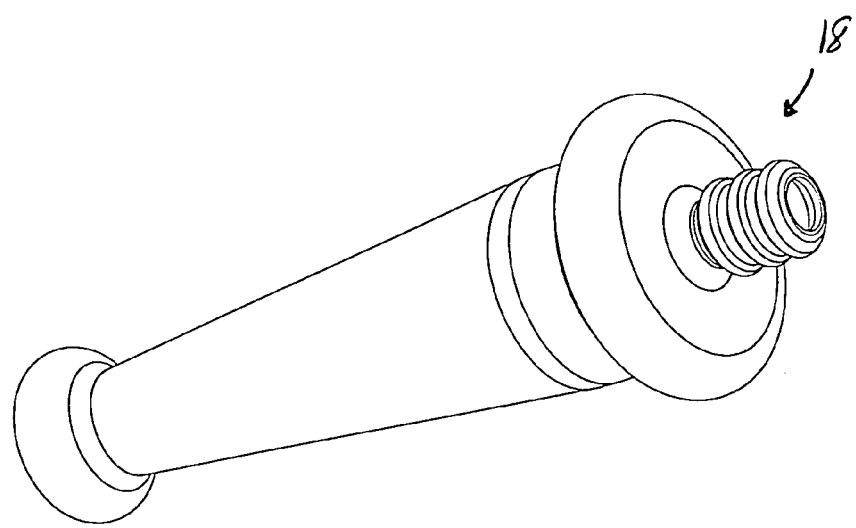
Figure 9:
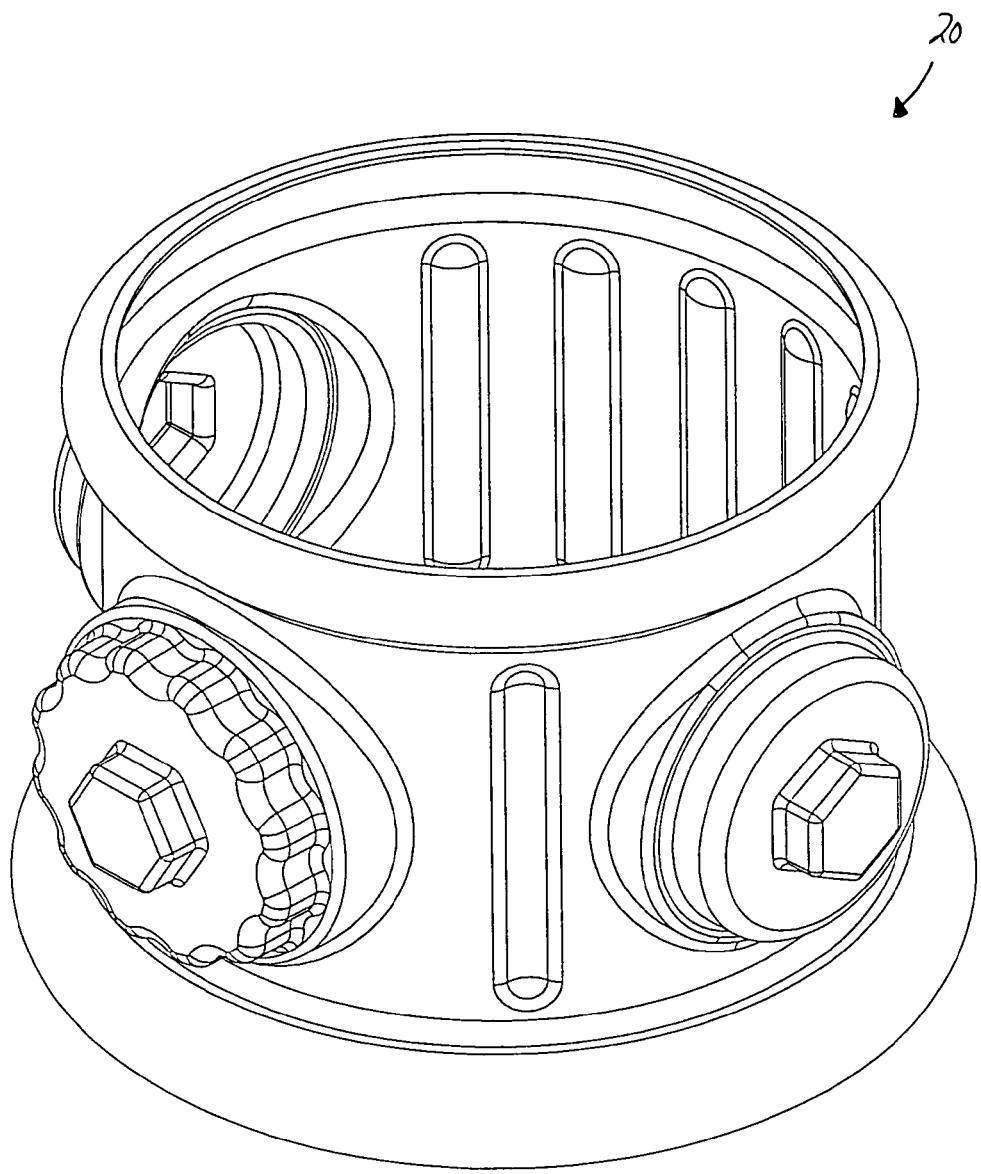
Figure 10:
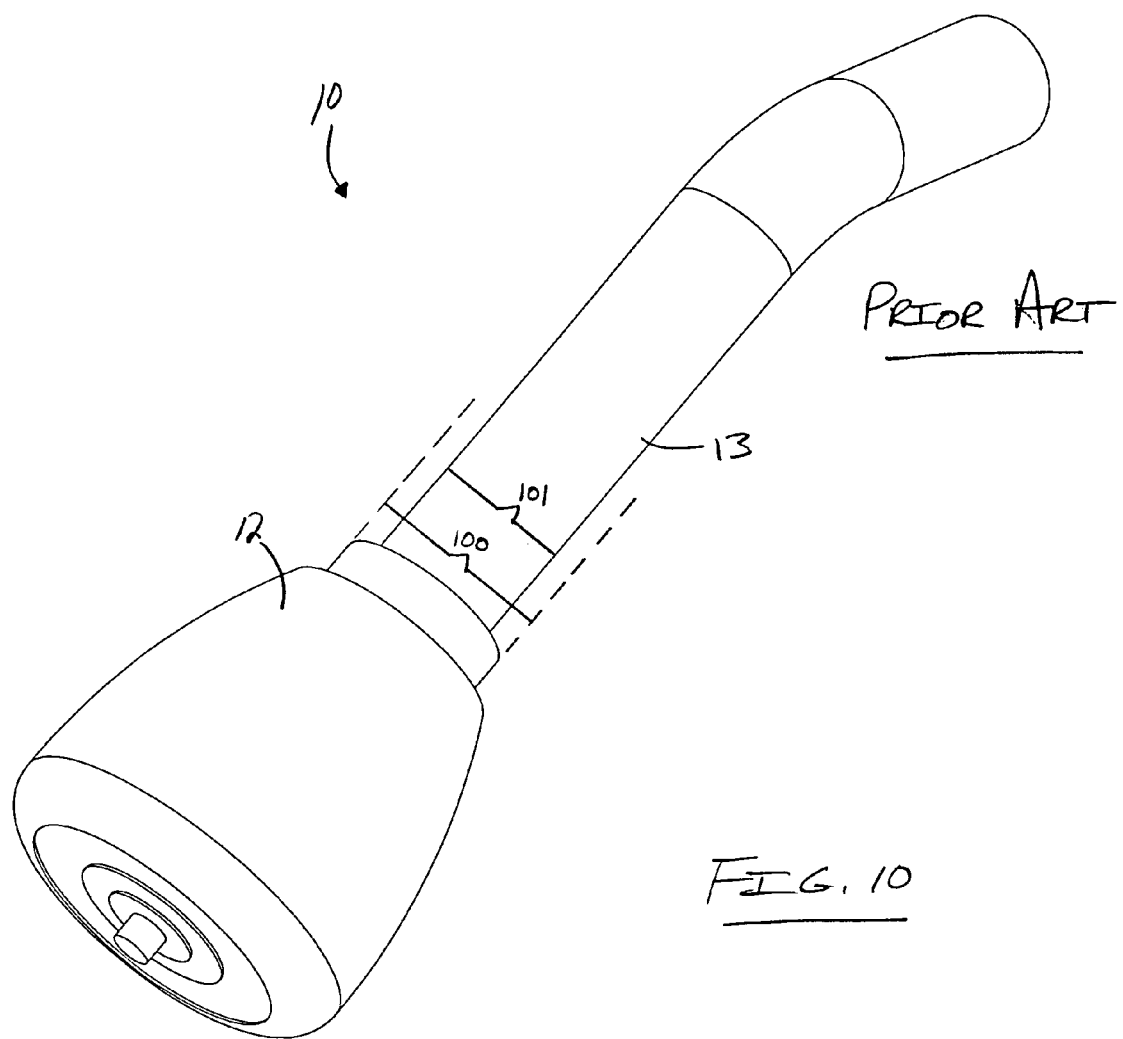
Figure 17:
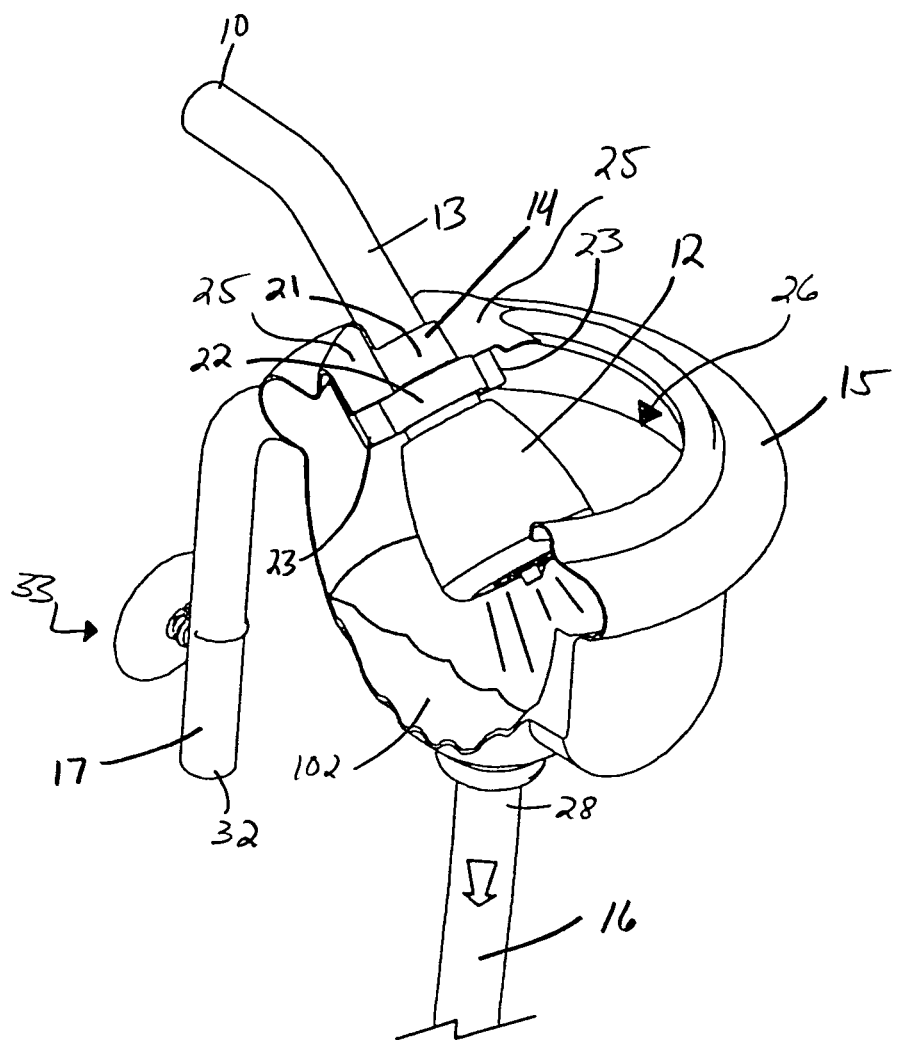
Figure 18:
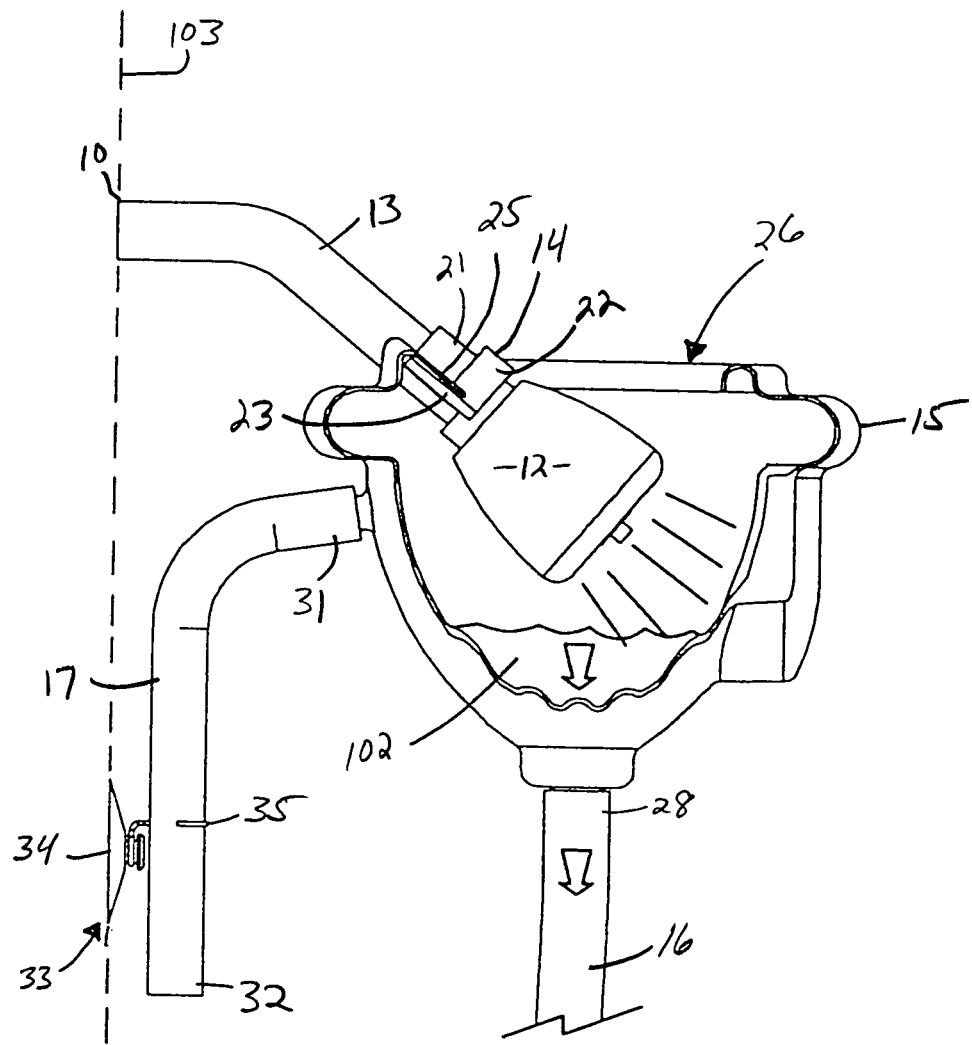
Figure 19:
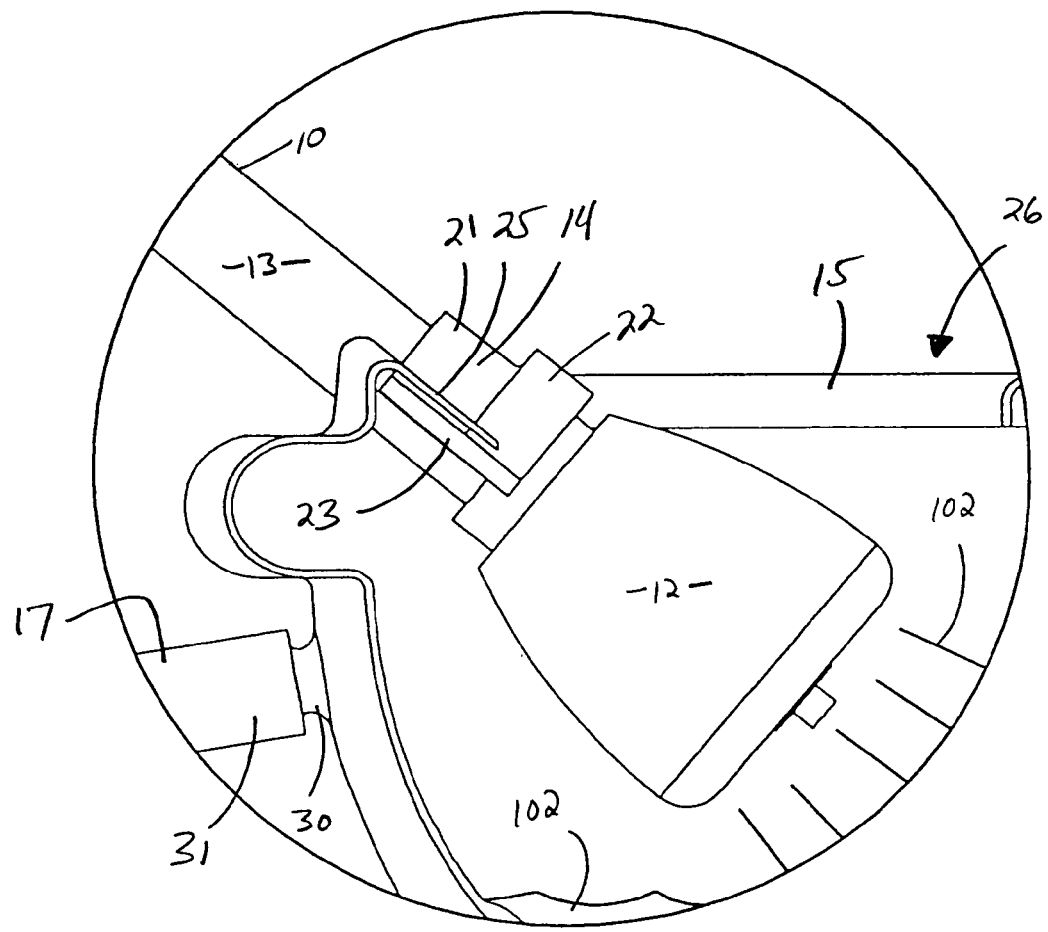
Figure 20:
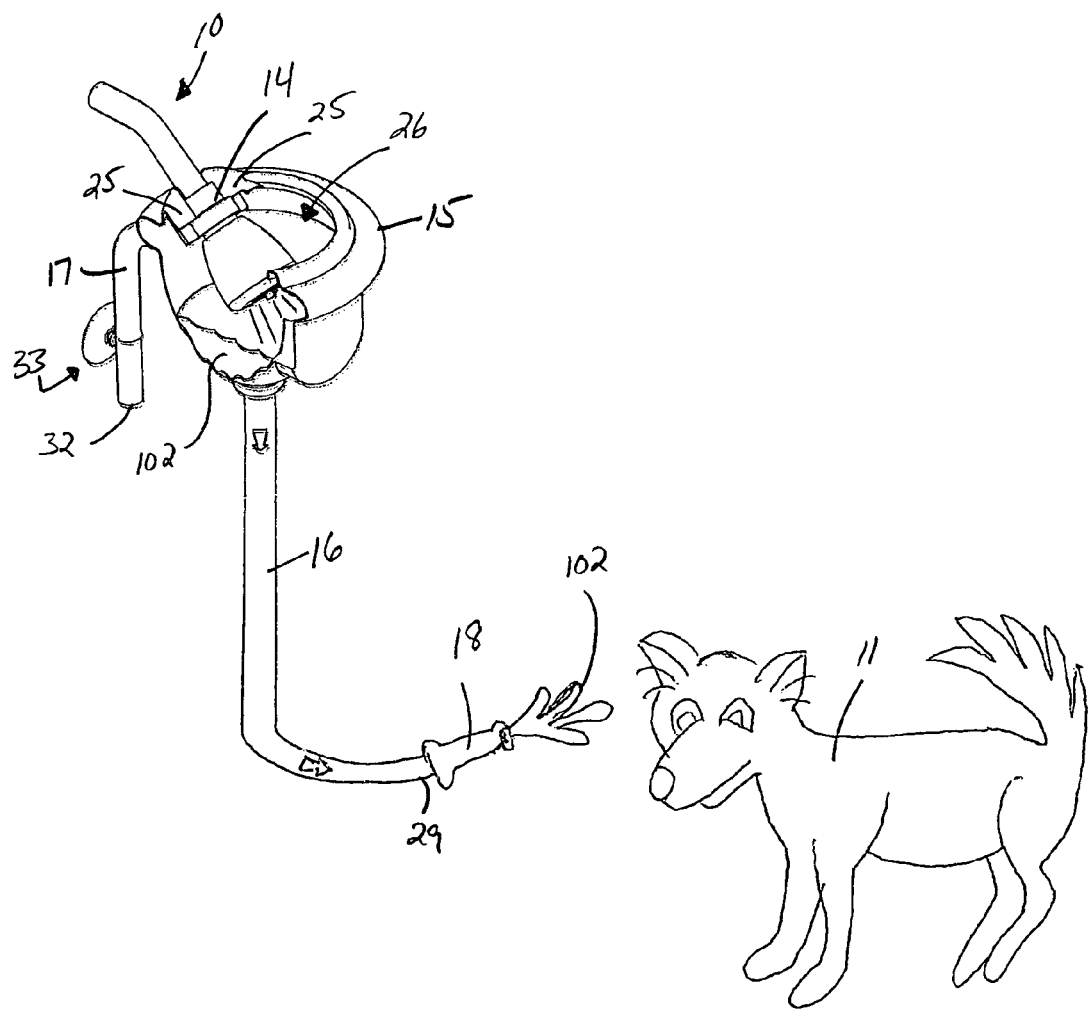
Figure 21:
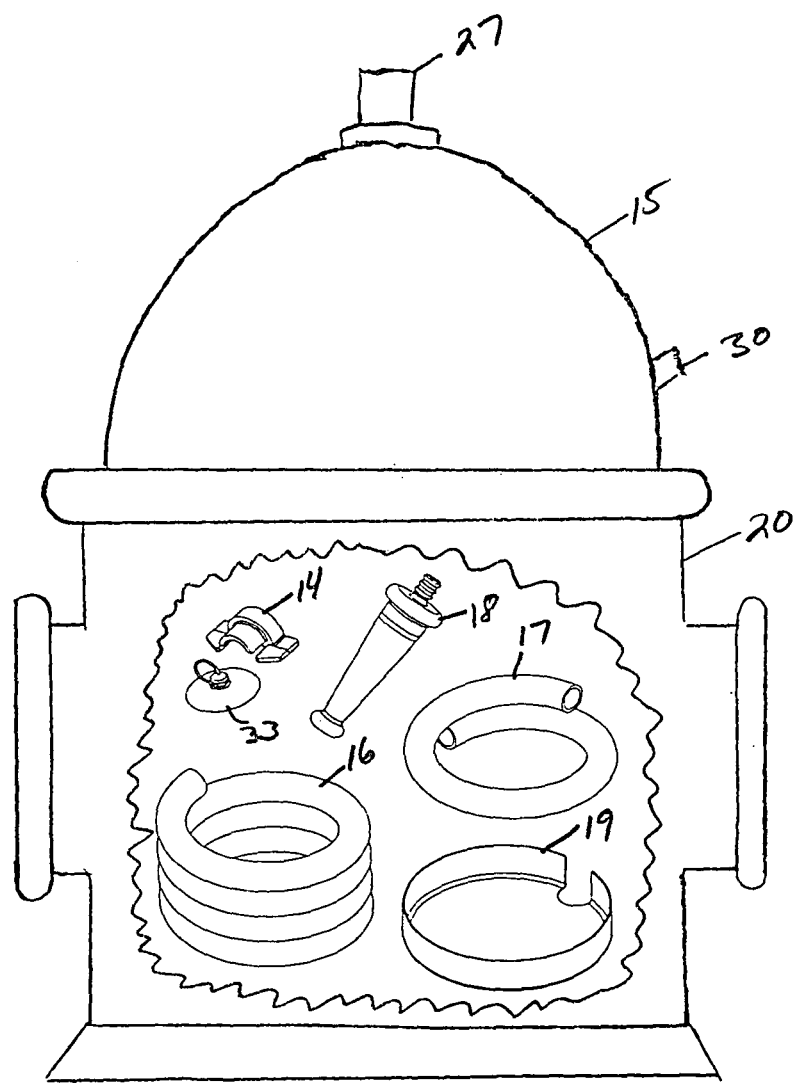

Figure No. 2 is an enlarged top perspective view of the funnel-shaped lid structure or funnel structure otherwise depicted in Figure No. 1.

Figure No. 3 is an enlarged top perspective view of the splash lid otherwise depicted in Figure No. 1.

Figure No. 4 is an enlarged top perspective view of the coiled second length of flexible conduit otherwise depicted in Figure No. 1.

Figure No. 5 is an enlarged top perspective view of the head-to-funnel interface device otherwise depicted in Figure No. 1.

Figure No. 6 is an enlarged top perspective view of the suction cup assembly otherwise depicted in Figure No. 1.

Figure No. 7 is an enlarged top perspective view of the first length of conduit otherwise depicted in Figure No. 1.

Figure No. 8 is an enlarged perspective view of the nozzle element otherwise depicted in Figure No. 1.

Figure No. 9 is an enlarged top perspective view of the base housing otherwise depicted in Figure No. 1.

Figure No. 10 is an enlarged perspective view of a basic prior art shower head assembly showing a length of shower head conduit and a shower head affixed to said conduit.

Figure No. 11 is a fragmentary side-by-side depiction (left to right) of (1) a suction cup assembly being affixed to a length of conduit, and (2) a head-to-funnel interface device being affixed to a shower head assembly.

Figure No. 12 is a reduced side perspective exploded type view of first and second lengths of conduit being affixed to a funnel structure with a nozzle element being affixed to the first length of conduit, and a suction cup assembly already affixed to the second length of conduit.

Figure No. 13 is a reduced top perspective first sequential view of the funnel structure just before it is affixed to the head-to-funnel interface device as already mounted on the shower head assembly.

Figure No. 14 is a reduced top perspective second sequential view of the funnel structure just after it is affixed to the head-to-funnel interface device as mounted on the shower head assembly.

Figure No. 15 is a fragmentary top perspective first sequential view of the splash lid just before it is seated atop the funnel structure as removably mounted the head-to-funnel interface device as mounted on the shower head assembly.

Figure No. 16 is a fragmentary side elevational second sequential type depiction of the splash lid just after it is seated atop the funnel structure as removably mounted the head-to-funnel interface device as mounted on the shower head assembly.

Figure No. 17 is a fragmentary top perspective view of the funnel structure mounted to the shower head assembly with parts of the funnel structure broken away to show water being collected inside the funnel structure as delivered thereto from the shower head assembly.

Figure No. 18 is a fragmentary side elevational type depiction of the funnel structure mounted to the shower head assembly with parts of the funnel structure broken away to show water being collected inside the funnel structure as delivered thereto from the shower head assembly.

Figure No. 19 is a fragmentary enlarged side elevational type depiction of the junction site intermediate the funnel structure and shower head assembly showing the head-to-funnel interface device interfacing the funnel structure with the shower head assembly.

Figure No. 20 is a top perspective diagrammatic type depiction of the apparatus according to the present invention (with parts of the funnel structure broken away to show otherwise hidden structure) depicting the apparatus outletting water in the direction of a fanciful creature.

Figure No. 21 is a generic side elevational type depiction of a funnel structure seated atop a base housing together resembling a fire hydrant or water-themed package with parts of the package broken away to show inner kit components.

DETAILED DESCRIPTION OF THE PREFERRED EMBODIMENT

Referring now to the drawings with more specificity, the present invention essentially provides a system, apparatus, and kit for enabling a user to wash a pet (such as a dog 11) adjacent a shower head assembly at 10. When considered systemically, the system according to the present invention comprises a shower head assembly 10 in combination with certain of the components otherwise incorporated in the apparatus and kit of the invention, including a head-to-funnel interface device as at 14, a funnel structure as at 15, first and second lengths of flexible conduit as at 16 and 17 respectively; a nozzle element as at 18; a splash lid as at 19; and a base housing as at 20.

The shower head assembly 10 usable in combination with the subject invention essentially and preferably comprises a shower head as at 12 and a length of shower head conduit as at 13. The shower head 12 preferably comprises a first head diameter as at 100 and the shower head conduit 13 preferably comprises a second conduit diameter as at 101 such that the first head diameter 100 is greater in magnitude than the second conduit diameter 101 as generally depicted in Figure No. 10.

The components incorporated into the apparatus and/or kit according to the present invention include a head-to-funnel interface device 14. The interface device 14 is a uniquely configured device for coupling a funnel structure as at 15 to the shower head assembly 10. The interface device 14 thus preferably comprises a conduit-engaging portion as at 21 and a head-engaging portion as at 22, which portions are semi-circular in transverse cross-section and coaxially aligned and alignable with the main axis of the shower head assembly 10. The conduit-engaging portion 21 is sized for receiving the second conduit diameter 101 and the head-engaging portion 22 is sized for receiving the first head diameter 100.

The head-engaging portion 22 comprises laterally opposed collar flanges as at 23, which collar flanges 23 extend toward the conduit-engaging portion 21 laterally adjacent thereto and thereby define laterally opposed gaps as at 24 between the conduit-engaging portion 21 and the head-engaging portion 22. The funnel structure 15 comprises certain device-engaging winged structure, which winged structure comprising laterally opposed wing flanges as at 25. The wing flanges 25 are supportable atop the collar flanges 23 for supporting the funnel structure 15 adjacent the shower head assembly 10. It is believed that the interface device 14 is central to the practice of the present invention.

The funnel structure 15 is essentially and preferably a funnel-shaped lid since the structure 15 provides a dual function, namely that of a funnel and that of a lid. Accordingly, the funnel-shaped lid or funnel structure 15 comprises a water inlet or mouth as at 26 and a water outlet or exit orifice as at 27. The water inlet 26 comprises the device-engaging winged structure having flanges 25, and thus the device-engaging structure of the funnel structure 15 interfaces with the interfacing device 14 for removably attaching the funnel-shaped lid or funnel structure 15 to the shower head assembly 10.

The first length of conduit 16 is attachable to the water outlet 27 via a first end 28 of the first length of conduit 16 as generally and comparatively depicted in Figure Nos. 12 versus 15-18. The first length of conduit 16 is extendable from the water outlet 27 for directing water 102 (as received in the funnel structure 15 from the shower head assembly 10) to the second end 29 of the first length of conduit 16 for selectively washing a pet such as a dog 11.

In this last regard, it is contemplated that the second end 29 of the first length of conduit 16 may be preferably outfitted with nozzle element 18. In other words, the nozzle element 18 is attachable to the second end 29 of the first length of conduit 16 such that the funnel-shaped lid or funnel structure 15 may receive water 102 from the shower head assembly 10, and the first length of conduit 16 may direct water 102 from the funnel-shaped lid 15 to the nozzle element 18 for enabling a user to selectively discharge water 102 for washing a pet as generally depicted in Figure No. 20.

The funnel-shaped lid or funnel structure 15 may further preferably comprise a water overflow outlet as at 30 to which the second length of conduit 17 may connect via a first end 31 of the second length of conduit 17. It may be seen from an inspection of the drawing figures that the overflow outlet 30 is preferably positioned intermediate the water inlet 26 and water outlet 27 of the funnel structure 15 for controllably outletting excess water 102 via the second length of conduit 17, which length of conduit may outlet water 102 via the second end 32 of the conduit 17.

Conceivably, the second length of conduit 17 may be removably attached to an adjacent support structure such as wall (as at 103) via certain means for removably fastening the second length of conduit 17. Said means may be exemplified by a suction cup assembly as at 33, which assembly 33 may comprise a suction cup 34 and a hook member 35 for hooking the second length of conduit 17 to the suction cup 34. It is thus contemplated that the apparatus and/or kit according to the present invention may well comprise the suction cup assembly 33 as an added option.

The system according to the present invention may further comprise a splash lid 19 for preventing water 102 from splashing over or beyond the limits of the water inlet 26. The splash lid 19 is thus preferably sized and shaped for seated placement upon the water inlet 26 for preventing water 102 from splashing over the water inlet 26. Notably, the splash lid may preferably comprise a circular configuration for matching the circular water inlet 26 and further have a notch as at 36 for accepting the length of shower conduit 13 as generally and comparatively depicted in Figure Nos. 3 versus 15 and 16.

It is further contemplated that the present invention may be provided in certain pet wash-themed packaging, and thus the outer lid surface of the funnel structure 15 may resemble the upper portion of a fire hydrant or similar other themed lid structure such that the upper portion of the fire hydrant resembling funnel structure 15 may cover a base housing 20 having an outer base surface formed so as to resemble the lower portion of a fire hydrant. Notably, however, the primary function of the base housing 20 is to store or receive the disassembled components of the kit, including the splash lid 19, the first and second lengths of conduit 16 and 17, the nozzle element 18, and the interface device 18 as generally and diagrammatically depicted in Figure No. 21.

While the above description contains much specificity, this specificity should not be construed as limitations on the scope of the invention, but rather as an exemplification of the invention. For example, it is contemplated that the present invention essentially provides an apparatus for enabling a user to wash a pet adjacent a shower head, which apparatus comprises a head-to-funnel interface device (as at 14), a funnel structure or funnel-shaped lid (as at 15), and a length of conduit (as at 16).

The interface device comprises a conduit-engaging portion (as at 21) and a head-engaging portion (as at 22). The conduit-engaging portion 21 is sized (and shaped) for receiving the diameter (as at 101) of a shower head conduit length (as at 13), and the head-engaging portion is sized (and shaped) for receiving the diameter (as at 100) of a shower head (as at 12) extending from the conduit length.

The funnel structure may provide a second function as a (funnel-shaped) lid, but its primary function is to funnel water from a shower head to the length of conduit. Accordingly, the funnel-shaped lid or funnel structure has a water inlet (as at 26) and a water outlet (as at 27). The water inlet 26 has certain device-engaging structure for interfacing with the interfacing device so as to removably attaché the funnel structure to the shower head.

The length of conduit is attachable to the water outlet via a first end of the length of conduit, and is extendable from the water outlet for outletting water from a second end of the length of conduit for washing a pet such as a dog. The second end of the length of conduit may be outfitted with a nozzle element (as at 18) for enabling the user to selectively discharge water (as at 102) from the nozzle element toward the pet as forced from the nozzle element by way of gravitational force/pressure.

The pet wash kit aspects of the present invention enable the user to outfit a shower head assembly so as to enable a user to wash a pet adjacent the outfitted shower head assembly. The pet wash kit according to the present invention may thus comprise a head-to-funnel interface device, a funnel structure, at least one length of conduit, a nozzle element, a splash lid (as at 19), and a base housing (as at 20) for receiving and storing the noted components. The funnel structure of funnel-shaped lid may comprise an outer lid surface resembling a top portion of a fire hydrant or similar water-themed object for enhancing the pet washing experience, while the base housing may well comprise an outer base surface a bottom portion of a fire hydrant or similar water or wash-themed object which housing is matable with the funnel-shaped lid for enclosing the disassembled splash lid, length(s) of conduit, nozzle element, and interface device within the base housing. Together, the outer surfacing the funnel structure and base housing provide a uniquely themed packaging scheme or storage means for the pet wash kit according to the present invention.

Accordingly, although the invention has been described by reference to certain preferred and alternative embodiments, including kit-related aspects, it is not intended that the novel disclosures herein presented be limited thereby, but that modifications thereof are intended to be included as falling within the broad scope and spirit of the foregoing disclosure, the following claims and the appended drawings.

I claim:

1. A system for enabling a user to wash a pet adjacent a shower head, the system comprising, in combination:
   a shower head assembly, the shower head assembly comprising a shower head and a length of shower head conduit, the shower head having a first diameter and the shower head conduit having a second diameter, the first diameter being greater in magnitude than the second diameter;
   a head-to-funnel interface device, the interface device comprising a conduit-engaging portion and a head-engaging portion, the conduit-engaging portion being sized for receiving the second diameter and the head-engaging portion being sized for receiving the first diameter, the head-engaging portion comprising laterally opposed collar flanges, the collar flanges extending toward the conduit-enraging portion laterally adjacent thereto for supporting the collar flanges;
   a funnel structure, the funnel structure, having a water inlet and a water outlet, the water inlet having device-engaging structure, the device-engaging structure comprising winged flanges, the device-engaging structure for interfacing with the interfacing device for removably attaching the funnel structure to the shower head assembly, said collar and wing flanges for supporting the funnel structure adjacent the shower head assembly; and
   a first length of conduit, the first length of conduit being attachable to the water outlet via a first end of the length of conduit, the length of conduit being extendable from the water outlet, the funnel structure for receiving water from the shower head assembly, the first length of conduit for directing water from the funnel structure for enabling a user to selectively discharge water for washing a pet.

2. The system of claim 1 comprising a nozzle element, the nozzle element being attachable to a second end of the length of conduit for enhancing the user's ability to selectively discharge water from the length of conduit.

3. The system of claim 1 wherein the funnel structure comprises a water overflow outlet, the water overflow outlet being positioned intermediate the water inlet and water outlet for controllably outletting excess water via the water overflow outlet.

4. The system of claim 3 comprising a second length of conduit, the second length of conduit extending from the water overflow outlet for controllably directing excess water from the water overflow outlet.

5. The system of claim 1 comprising a splash lid, the splash lid being sized and shaped for seated placement upon the water inlet for preventing water from splashing over the water inlet.

6. An apparatus for enabling a user to wash a pet adjacent a shower head, the apparatus comprising:
 a head-to-funnel interface device, the interface device comprising a conduit-engaging portion and a head-engaging, the conduit-engaging portion being sized for receiving the diameter of a shower head conduit length and the head-engaging portion being sized for receiving the diameter of a shower head extending from the shower head conduit length, the head-engaging portion comprising laterally opposed collar flanges, the collar flanges extending toward the conduit-engaging portion laterally adjacent thereto;
 a funnel structure, the funnel structure having a water inlet, a water outlet, and device-engaging structure, the device-engaging structure interfacing with the interfacing device for removably attaching the funnel structure to the shower head; and
 a first length of conduit, the first length of conduit being attachable to the water outlet via a first end of the first length of conduit, the first length of conduit being extendable from the water outlet for outletting water from a second end of the first length of conduit.

7. The apparatus of claim 6 wherein the device-engaging structure comprises laterally opposed wing flanges, the wing flanges being supportable atop the collar flanges for supporting the funnel structure adjacent the shower head.

8. The apparatus of claim 6 wherein the funnel structure comprises a water overflow outlet, the overflow outlet being positioned intermediate the water inlet and water outlet for controllably outletting excess water via the overflow outlet.

9. The apparatus of claim 8 comprising a second length of conduit, the second length of conduit extending from the overflow outlet for controllably directing excess water from the overflow outlet.

10. The apparatus of claim 6 comprising a splash lid, the splash lid being sized and shaped for seated placement upon the water inlet for preventing water from splashing over the water inlet.

11. The apparatus of claim 6 comprising a nozzle element, the nozzle element being attachable to a second end of the length of conduit, the funnel structure for receiving water from the shower head, the first length of conduit for directing water from the funnel structure to the nozzle element, the nozzle element for enhancing a user's ability to selectively discharge water from the first length of conduit.

12. A pet wash kit for outfitting a shower head so as to enable a user to wash a pet adjacent the outfitted shower head, the pet wash kit comprising:
 a head-to-funnel interface device, the interface device comprising a conduit-engaging portion and a head-engaging portion, the conduit-engaging portion being sized for receiving the diameter of a shower head conduit length and the head-engaging portion being sized for receiving the diameter of a shower head extending from the conduit length, the head-engaging portion comprising laterally opposed collar flanges, the collar flanges extending toward the conduit-engaging portion laterally adjacent thereto;
 a funnel structure, the funnel structure having a water inlet, a water outlet, and device-engaging structure, the device-engaging structure being engageable with the interfacing device for removably attaching the funnel structure to the shower head; and
 a first length of conduit, the first length of conduit being attachable to the water outlet via a first end of the first length of conduit, the first length of conduit being extendable from the water outlet for outletting water from a second end of the first length of conduit.

13. The kit of claim 12 comprising a nozzle element, the nozzle element being attachable to a second end of the first length of conduit, the funnel structure for receiving water from the shower head, the first length of conduit for directing water from the funnel structure to the nozzle element, the nozzle element for enhancing a user's ability to selectively discharge water from the first length of conduit for washing a pet.

14. The kit of claim 12 comprising a splash lid, the splash lid being sized and shaped for seated placement upon the water inlet for preventing water from splashing from the water inlet.

15. The kit of claim 12 comprising a second length of conduit, the second length of conduit being attachable to a water overflow outlet firmed in the funnel structure, the second length of conduit thus being extendable from the overflow outlet for controllably directing excess water from the overflow outlet.

16. The kit of claim 12 comprising a base housing, the base housing for storably receiving disassembled kit components.

17. The kit of claim 12 comprising means for removably fastening the second length of conduit to a support structure.

18. The kit of claim 12 comprising a base housing, the funnel structure comprising an outer funnel surface and the base housing comprising an outer base surface, the outer funnel and base surfaces respectively resembling a top portion and a bottom portion a unitary themed structure, the funnel structure being matable with the base housing for enclosing kit components therewithin, the outer funnel and base surfaces for providing themed storage means.

* * * * *